March 30, 1926.
H. GREATRIX
COMBINED STONE AND ROOT GATHERER
Filed August 29, 1923
1,578,600
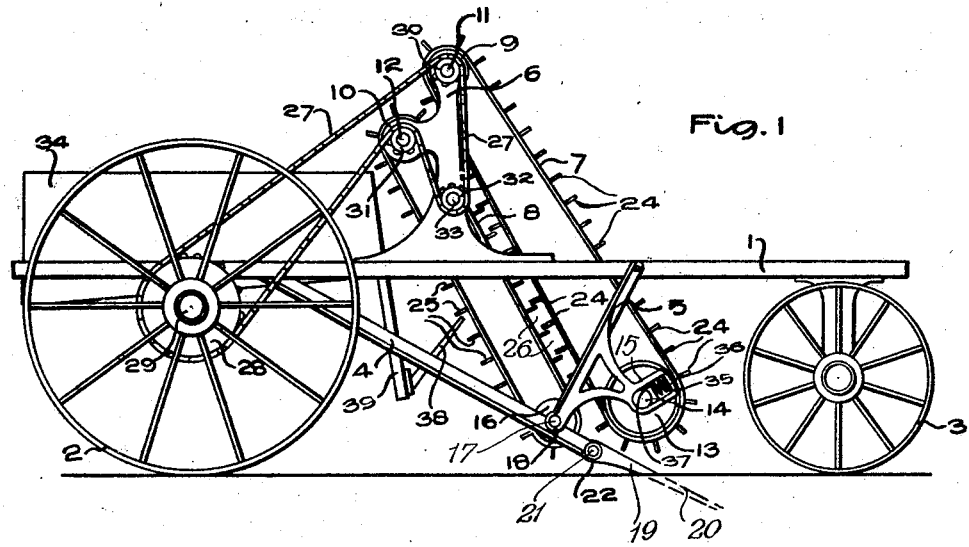
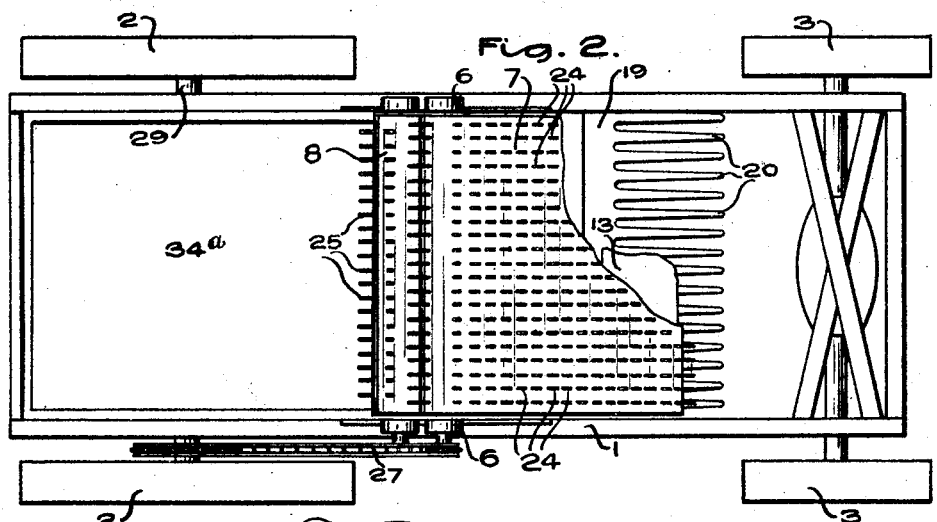
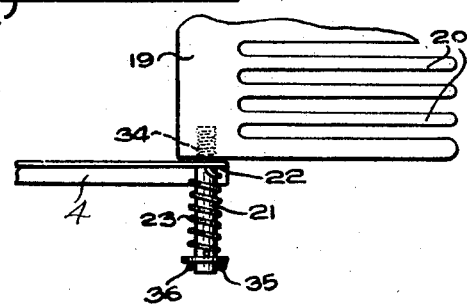
INVENTOR
HENRY GREATRIX.
By. Arthur................
ATTYS.

Patented Mar. 30, 1926.

1,578,600

UNITED STATES PATENT OFFICE.

HENRY GREATRIX, OF NIAGARA FALLS, ONTARIO, CANADA.

COMBINED STONE AND ROOT GATHERER.

Application filed August 29, 1923. Serial No. 659,993.

*To all whom it may concern:*

Be it known that I, HENRY GREATRIX, a subject of the King of Great Britain, and a resident of the city of Niagara Falls, in the county of Welland, in the Province of Ontario, Canada, have invented certain new and useful Improvements in Combined Stone and Root Gatherers, of which the following is the specification.

My invention relates to improvements in combined stone and root gatherers and the object of the invention is to devise a machine that can be adjusted to gather either roots or stones as the case may be.

A further object is to provide an interchangeable digging member which will permit the machine being used for harvesting roots of different sizes and a still further object is to devise a machine, the digging member of which will automatically disengage when it encounters an obstruction in the ground.

My invention consists of a combined stone and root gatherer constructed and arranged all as hereinafter more particularly described and illustrated in the accompanying drawing in which:

Fig. 1 is a side elevational view of my machine.

Fig. 2 is a plan view thereof, and

Fig. 3 is an enlarged detail of the means for resiliently securing the digging member to the frame of the machine.

Like characters of reference indicate corresponding parts in the different views.

1 is the main frame of the machine, 2 and 3 are the rear and front pairs of land wheels suitably mounted thereon. 4 are a pair of downwardly and forwardly extending bracket members secured at their rear ends one on each side of the frame 1 in the vicinity of ground wheels 2.

5 are a pair of downwardly extending struts secured at their upper ends to the frame 1 intermediately of its length and at their lower ends to the bracket members 4 in the vicinity of their free ends. 6 are a pair of upwardly extending standards mounted on the frame 1 intermediately of its length. 7 and 8 are belt conveyors which are adapted to pass over rollers 9 and 10 pivotally mounted on the transverse shafts 11 and 12 which are journalled in the upwardly extending brackets 6.

13 is a roller mounted upon a shaft 14 which is slidably journalled in a pair of slotted bearings 15 provided on the struts 5, such roller being adapted to carry the lower end of the conveyor 7. 35 are springs inserted between the bearing caps 36 and sliding cap 37 bearing on the shaft 14, the springs permitting an upward movement of the shaft 14 in the bearings, should the conveyor belt 7 passing over the roller 13 come into contact with a stone or root of unusual size. 16 is a roller adapted to carry the lower end of the conveyor 8, said roller being mounted upon a transversely extending shaft 17 which is suitably journalled in bearings 18 positioned at the intersection of the strut 5 and bracket member 4.

19 is the root or stone digging member which is provided with a plurality of forwardly extending spaced apart teeth 20. 21 are a pair of stub shafts threaded on their inner ends and adapted to be screwed into threaded sockets 34 one in each end of the member 19. 22 are bearings provided on the lower extremity of the member 4 through which the stub shafts are adapted to extend.

23 are a pair of spiral springs encircling the protruding portions of the stub shafts 21, the inner end of such springs being secured to the bearings 22 and the outer ends thereof being secured to the stub shafts 21, such springs being so adjusted that the digging member 19 is at the correct digging angle, as is clearly illustrated in Figure 1. Should the digging member strike any obstruction the springs 23 will permit its swinging back until such obstruction is cleared, when it will immediately swing forward under the influence of such springs. 24 are a plurality of rows of outwardly extending teeth provided upon the belt conveyor 7 and 25 are similar teeth provided upon the belt conveyor 8.

The teeth 24 and the teeth 25 have the same spaced relation so that as they come together spaces 26 are formed in which the roots are carried upwardly without injury.

27 is a driving chain adapted to pass over a sprocket wheel 28 secured on the live axle 29 of the land wheels 2, said chain 27 passing over sprocket wheels 30 and 31 provided upon the outwardly extending ends of the respective conveyor roller carrying shafts 11 and 12.

32 is a sprocket wheel pivotally mounted upon a stub shaft 33 on the lower portion of the bracket member 6, the chain 27 being adapted to pass thereover so that such chain has a larger bearing surface over the sprocket wheel 31 than would be the case if such sprocket 33 were not inserted. 34ª is a root or stone receiving receptable provided upon the frame 1 in the vicinity of its rear end, the forward end of such receptable being in the vicinity of the upper end of the belt conveyor 8 so that when the roots are carried over the roller 10 by such conveyor they will drop thereinto.

38 are a plurality of upwardly extending spaced apart teeth mounted upon the downwardly extending frame 39 positioned on the frame 1 rearwardly of the belt conveyor 8, the teeth 25 thereon being adapted to pass between the teeth 38 and thus be cleared of any weeds which may have been carried around by such teeth.

When soft roots are being gathered I place rubber sleeves on the teeth 24 and 25 so that when the roots come into contact with the teeth they will not be bruised.

The operation of the device is as follows:

The machine is provided with a plurality of interchangeable digging members 20, the teeth of which are of different spacing so that a digging member may be inserted having teeth suitably spaced for the root that is to be dug. For example, when digging potatoes a digger having finer and closer spaced teeth will be used, whereas the digging of turnips or other large roots will require a much larger spacing of the teeth, it being desirable to permit the clay falling between the teeth before the roots are lifted by the conveyor. As the machine is drawn forwardly the digger passes under the roots or stones which will slide upwardly on its inclined surface, the clay falling between the teeth, until they come into contact with the teeth 24 of the toothed belt conveyor 7. As such belt conveyor travels in a clockwise direction the roots or stones will be projected rearwardly until they come into contact with the teeth 25 on the toothed belt conveyor 8 and are carried upwardly and deposited in the receptacle 34ª, the belt being actuated from the ground wheel axle 23 by means of the sprocket chain 27.

On desiring to change the digging member 19 it is merely necessary to remove the springs 23 from the stub shafts 21 by the removal of the cotter pin 35 and washer 36. The stub shafts 21 are then unscrewed from the digging member 19, permitting such digging member to be removed and another inserted in its place. The stub shafts 21 are then inserted, the springs 23 being placed thereon and the washer and cotter pin 35 inserted.

From the above description it will be seen that I have devised a very simple and effective machine which can be readily utilized for either digging stones or roots by the insertion of a digger of a grade suitable to the root which is to be dug.

What I claim as my invention is:

1. An apparatus of the character described comprising a frame, bearings carried thereby, a digging blade provided at its ends with stub shafts journalled in said bearings and spring means coacting with said bearings and stub shafts to yieldably maintain the blade at an angle to the vertical, said blade being movable against resistance of said spring means upon encountering an obstruction.

2. An apparatus of the character described comprising a portable frame, bearings carried thereby, a digging blade provided at the ends thereof with stub shafts journalled in said bearings and coiled springs encircling said stub shafts and having one terminal secured thereto, the remaining terminals of said springs being secured to the bearings, said springs serving to yieldably hold the blade in a predetermined position.

3. An apparatus of the character described comprising a portable frame, bearings carried thereby, a digging blade positioned between said bearings and provided with threaded sockets formed in the end portions thereof, stub shafts passing loosely through said bearings and threaded into said sockets and spring means serving to yieldably hold the blade at a predetermined inclination.

4. An apparatus of the character described comprising a portable frame, a pair of downwardly and forwardly extending bracket members having their rear ends secured to the sides of said frame, a pair of downwardly extending struts having their upper ends secured to the sides of the frame and their lower ends secured to the bracket members, bearings carried by the bracket members forwardly of the intersection with said struts, a digging blade carried by stub shafts rotatably mounted in said bearings, springs encircling said stub shafts and secured thereto and to the bracket members in such manner as to hold the blade at a predetermined inclination.

5. The combination with the structure recited in claim 4 of cooperating conveyor means comprising brackets projecting forwardly from said struts, a shaft carried by said brackets and equipped with rollers positioned forwardly of the stub shafts mounting said blade, further bearings formed at the intersection of the blade supporting brackets and the struts, a shaft mounted in said last mentioned bearings and equipped with rollers positioned rearwardly of the stub shafts mounting said blade, front and rear upper rollers mounted above the frame in alignment with said first mentioned rollers, a toothed conveyor belt connecting the upper and lower rollers of the front set and a similar belt connecting the upper and lower rollers of the rear set.

HENRY GREATRIX.